3,000,231
FASTENING DEVICE
Clarence W. Cochran, Belmont, Mass., assignor to United-Carr Fastener Corporation, Cambridge, Mass., a corporation of Delaware
Filed Feb. 15, 1960, Ser. No. 8,551
3 Claims. (Cl. 74—502)

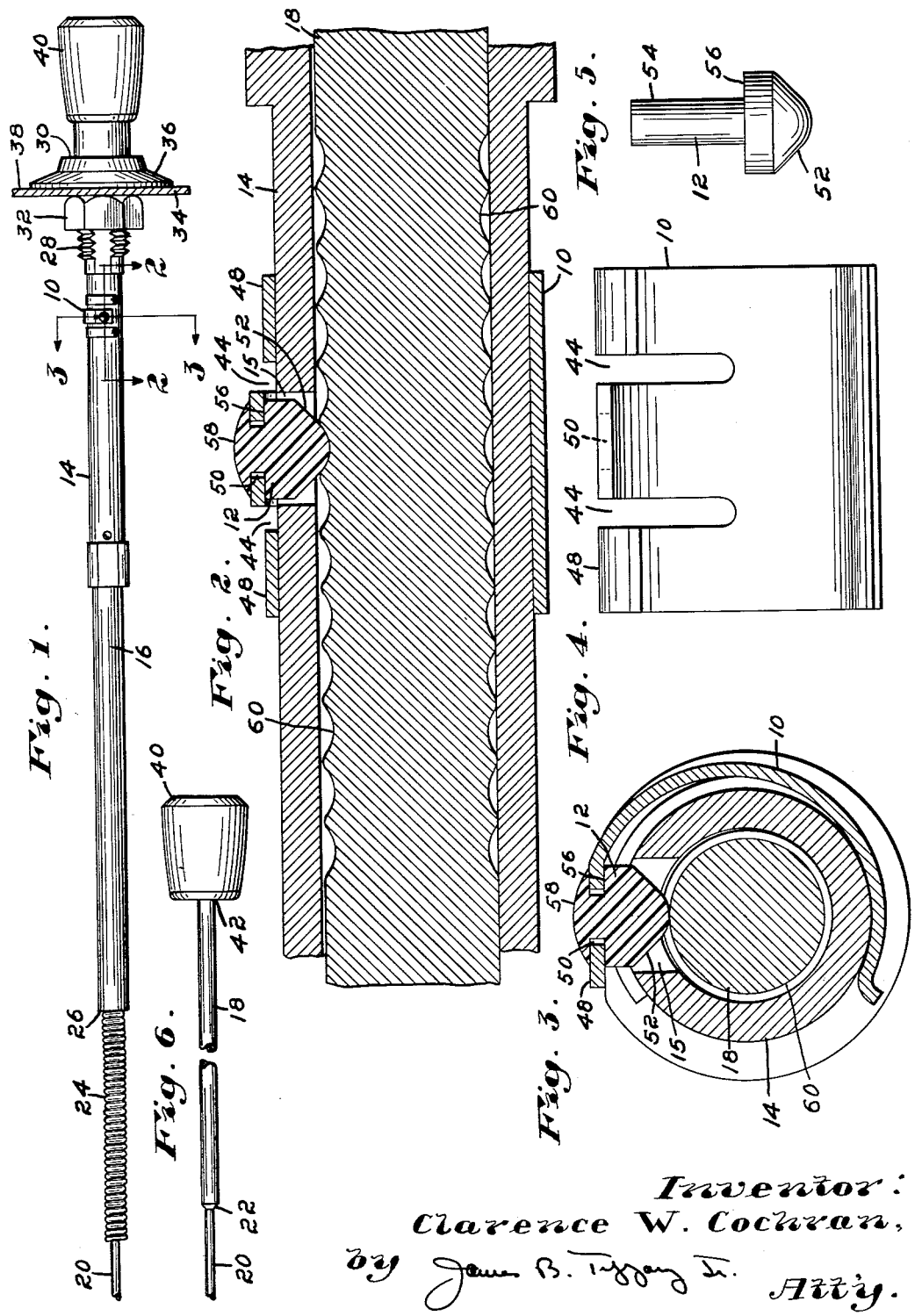

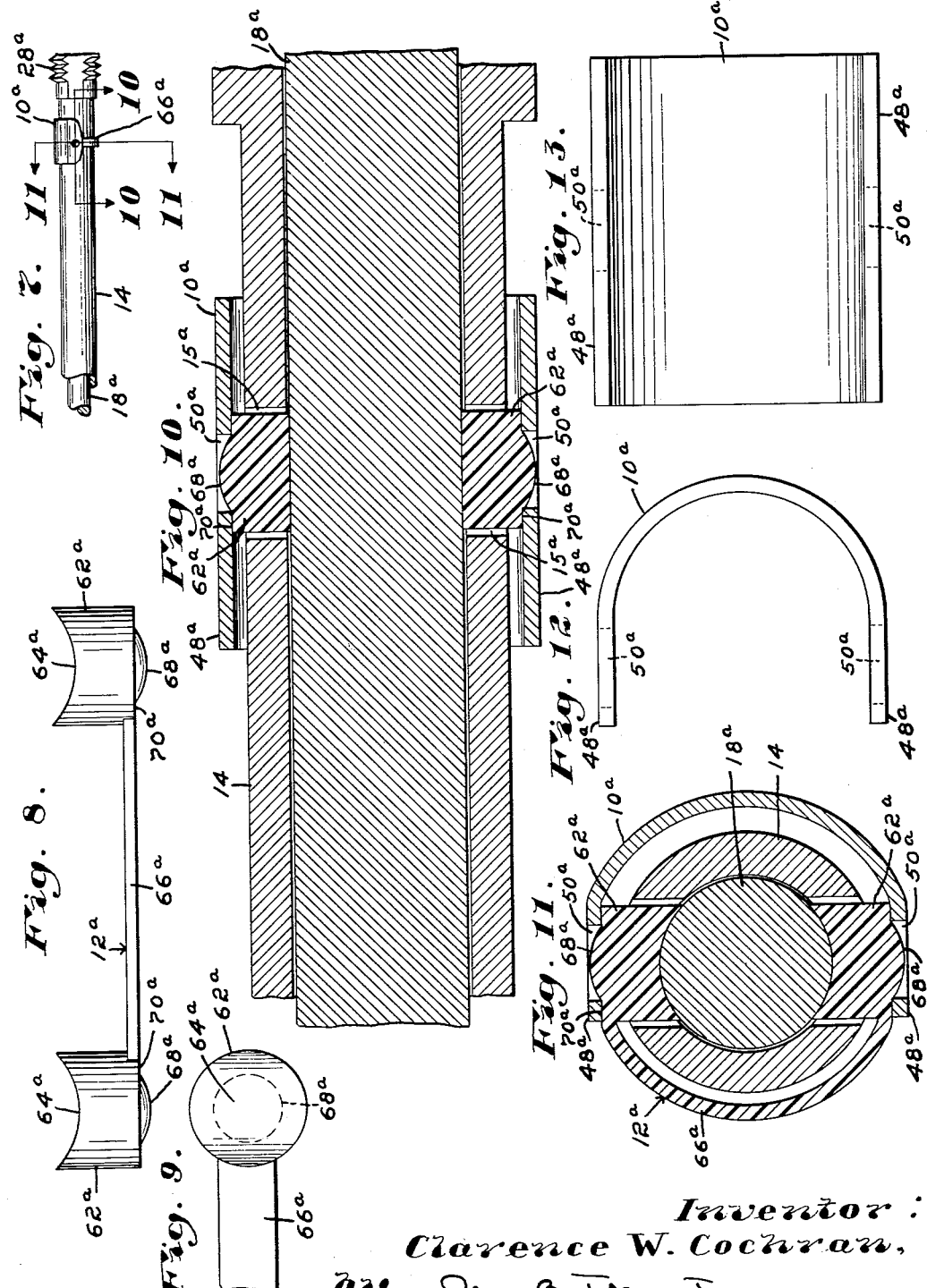

This invention relates generally to a fastening device and more particularly to a fastener for retaining a remote control device, such as a Bowden wire or the like in assembly.

In the automotive industry, there is a continuous demand for remote control apparatus to operate vent mechanisms, and defroster controls or the like. The most common method of operating these devices is through the use of a Bowden wire because of its flexing ability and adaptability to conform to irregular passages. However, difficulties have been experienced in retaining the Bowden wire in different stop positions due to the vibrating effects of a moving vehicle which act to change the setting. The existing types of Bowden wires are maintained in assembly merely by a friction fit and at various positions of their travel the metal to metal contact results in excessive noise.

The object of this invention is to provide a fastener for indexing a Bowden wire in a predetermined position.

A further object of this invention is to provide a fastener which will insulate an inner member of a Bowden wire apparatus from a portion of the outer shell.

Another object of the invention is to provide a simple and economical fastener having a non-metallic member secured thereto adapted to exert lateral pressure on a pair of telescopically engaged members.

Other objects of the invention will, in part, be obvious, and will, in part, appear hereinafter.

In the drawings:

FIG. 1 is a top plan view of the fastener in assembly with a Bowden wire;

FIG. 2 is a view in section taken on line 2—2 of FIG. 1;

FIG. 3 is a view in section taken on line 3—3 of FIG. 1;

FIG. 4 is a view in front elevation of the fastener clip;

FIG. 5 is a view in side elevation of one component of the fastener;

FIG. 6 is a view in side elevation of the inner shaft of the Bowden wire;

FIG. 7 is a top plan view of the modified form of the fastening device assembled on a Bowden wire;

FIG. 8 is a view in side elevation of the modified form of the fastener;

FIG. 9 is a top plan view of the contact member of the modified form of the fastener of FIG. 8;

FIG. 10 is a view in section taken on line 10—10 of FIG. 7;

FIG. 11 is a view in section taken on line 11—11 of FIG. 7;

FIG. 12 is a view in side elevation of a clip before assembly with the contact member; and FIG. 13 is a view in front elevation of the clip illustrated in FIG. 12.

Referring to the drawings, there is illustrated a fastener 10 having a non-metallic component 12 assembled therewith adapted for attachment to housing 14 of a Bowden wire apparatus 16.

The Bowden wire apparatus 16 includes the outer housing 14 with an opening 15 therein and a telescopic inner shaft 18 having a flexible wire portion 20 joined to one end 22. A flexible projective sheath 24 extends from one end 26 of the housing 14 encompassing the wire portion 20. External threads 28 are formed in the housing adjacent the opposite end 30 which cooperates with a nut 32 to secure the Bowden wire to a support 34. A decorative flange 36 radially extends from the distal end of the housing adapted to be mounted on one face 38 of the support 34. A knob 40 is secured to the opposite end 42 of the inner shaft 18 to provide adjusting means.

As illustrated in FIGS. 4 and 5, the fastening device adapted for use with the Bowden wire comprises a resilient clip member 10 and a contact portion 12 formed of a non-metallic material such as polyamide or the like. The clip member 10 is formed in a generally C-shaped configuration having a plurality of longitudinal slots 44 extending from one end 48 into the body of the clip for the purpose of tension relief. An aperture 50 is formed in the mid-lateral portion of the clip adjacent the end 48 for a purpose to be described hereinafter. The contact portion 12 includes a tapered bulbous head 52 having a shank of lesser diameter 54 extending from one end. Disposed between the head 52 and the shank 54 is a radially extending flange 56. The contact portion 12 is assembled with the clip member 10 by axial insertion of the shank 54 from the interior of the clip through the aperture 50 and deforming or heat sealing the shank end 58 to cause the end of flow or deform outwardly over the outer surface of the clip 10. The radial flange 56 has a relatively greater diameter than the aperture 50 and cooperates with the deformed end to retain the contact member in assembly as illustrated in FIG. 3.

FIG. 2 shows one form of the Bowden wire where the inner shaft 18 has a series of serrations 60 formed on the outer surface to provide an effective method of indexing the relative position of the housing 14 with respect to the shaft 18.

FIGS. 7 through 13 illustrate a modified form of the invention which is utilized with a smooth shaft 18a. The resilient clip member 10a is primarily C-shaped and includes a pair of openings 50a adjacent each distal end 48a. The non-metallic contact member 12a comprises a pair of buttons 62a having concave surfaces at one end 64a joined by a flexible web 66a and having projections 68a of lesser diameter than the buttons 62a extending from the opposite end 70a. The contact member 12a is assembled with the clip 10a by juxtaposing the contact member along the inner surface of the clip so that the projections 68a protrude through the apertures 58a. The outer housing 14 has a pair of opposed openings 15a therethrough which allow the buttons 62a to come in contact with the inner shaft when the clip is assembled.

It will readily be seen that the clip having a semi-circular configuration may be snapped into engagement with the housing so that the non-metallic contact member engages the surface of the inner shaft, thereby creating a predetermined amount of lateral pressure on the inner shaft to resist relative axial movement due to vibrations inherent in a moving vehicle. The final installation of the Bowden wire within the support is facilitated by the smallness of the clip allowing the nut to be slipped over the clip for engagement with the external threads.

Since certain other obvious modifications may be made in this device without departing from the scope of the invention, it is intended that all matter contained herein be interpreted in an illustrative and not in a limiting sense.

I claim:

1. A fastening device for use with a pair of telescoping members including an apertured outer housing and an axially moveable inner shaft, said fastening device comprising a resilient clip member adapted for snap engagement with a pair of non-metallic contact portions, said contact portions being joined by a web in juxtaposed relation within said clip, said contact portions entering into diametrically opposed frictional engagement with said inner shaft through said apertured housing.

2. A Bowden wire assembly including an apertured outer housing and an axially moveable inner shaft and fastening means adapted for snap engagement with said outer housing restricting relative movement of said inner shaft, said fastening means includes a resilient C-shaped clip member and a non-metallic contact portion assembled therewith adjacent a distal end and extending inwardly therefrom, said contact portion having a bulbous head for axial insertion within said apertured outer housing and entering into frictional engagement with said inner shaft.

3. A fastening assembly for use with a pair of telescoping members including an apertured outer housing and an axially movable inner shaft, said fastening assembly comprising a resilient clip member adapted for snap engagement with a pair of non-metallic contact portions, said contact portions having concave surfaces at one end and projections extending outwardly at the other end, said contact portions retained in assembly within said clip member by inter-engagement of said projection with recesses in said clip member, said fastening assembly entering into diametrically opposed frictional engagement with said inner shaft through said apertured housing.

References Cited in the file of this patent
UNITED STATES PATENTS

| | | |
|---|---|---|
| 2,134,756 | Gerry | Nov. 1, 1938 |
| 2,256,697 | Weber | Sept. 23, 1941 |
| 2,547,080 | Hebeler | Apr. 3, 1951 |

FOREIGN PATENTS

| | | |
|---|---|---|
| 1,064,822 | France | Dec. 30, 1953 |